3,099,624
OIL BASE DRILLING FLUID AND METHOD OF USE

Doyne L. Wilson, Pasadena, Calif., assignor to Oil Base, Inc., Compton, Calif., a corporation of California
No Drawing. Filed May 17, 1960, Ser. No. 29,566
7 Claims. (Cl. 252—8.5)

This invention relates to the drilling of oil and gas wells and has particular reference to oil base drilling fluids and other fluids used in connection with the drilling of wells, and to methods for use of the same.

In the art of drilling wells, especially drilling by the rotary method, it is necessary to circulate a drilling fluid or mud in the bore hole to cool and lubricate the drill bit, carry the cuttings to the surface of the well, control the formation pressure, and form a filter cake on the walls of the well which will minimize the loss of filtrate or drilling fluid to the formation being drilled.

In order to maintain sufficient hydrostatic head to balance formation pressures the weight of a drilling fluid may vary from 7.5 pounds per gallon to as much as 20 pounds or more per gallon. The weight of a drilling fluid is increased by the addition of finely ground materials such as limestone, barium sulfate, iron oxide and galena.

Some underground formations contain water sensitive clays and shales which swell and disintegrate when contacted by water base muds and/or filtrate therefrom, creating an acute drilling problem.

If this occurs in an oil zone the well productivity may be seriously impaired. To avoid drilling and well damage problems of this nature, it has become customary to use drilling fluids which (1) are substantially free of water, (2) lose only oil as the filtrate, and (3) cause no swelling or disintegration of water sensitive clays and shales.

Such fluids are called oil-base fluids since they usually comprise a hydrocarbon oil/or oils as the major component of the liquid phase to which various materials are added to impart the desired drilling fluid properties.

It is essential that the solids in an oil base drilling fluid be dispersed in an oil-wet condition. Commercial oil base fluids should be so designed that desirable properties are retained with a minimum of maintenance treatment for reasonable amounts of contamination.

Under the conditions of use an oil base fluid usually becomes contaminated with water and/or clay-water mud. The clay-water mud may be moderate or high pH, unlimed or limed.

The oil base mud may become contaminated with water on the surface (heavy rain, careless use of water hose) or in the hole from water-bearing formations. The oil base mud may become contaminated with clay-water mud during the changeover when the clay-water mud in the hole is displaced by oil base mud just prior to drilling into the oil zone, or from leakage from a clay-water mud storage pit or tank. When drilling through water sensitive clay and shale beds with an oil base mud considerable clay and/or shale is drilled up and some of it is suspended in the mud. If the oil base mud becomes contaminated with about 15% water or water base muds either prior to drilling through clay beds, or after, the clay begins to hydrate and tends to agglomerate and settle. If the oil base mud is weighted the situation worsens with increasing mud weight, and degree and kind of contamination. At mud densities above about 12 pounds per gallon the problem becomes particularly acute.

For example, an oil base mud with a density of 17.4 pounds per gallon may tolerate 15% water contamination fairly well. But the same mud will not tolerate 15% clay-water mud contamination. In the latter case continued agitation results in an increasing aggregation of the clay particles which progressively absorb the weight solids rendering them water wet, the entire mass becoming semiplastic. This situation is worsened if the clay water mud is a high pH lime base type.

It is accordingly an important object of the present invention to provide a means for preventing, or overcoming, the formation and/or deposition of incompatible water wet solids of clay and weight materials in an oil base drilling fluid system.

Another object of this invention is to provide a means for treating water-contaminated oil base drilling fluids so as to prevent accumulation of clay sludge when the water contaminated fluid subsequently comes in contact with a hydratable clay.

Another object of this invention is to provide a means for treating clay-water mud contaminated oil base drilling fluids, either before or after, contamination, so as to maintain the mud solids in an oil wet and dispersed condition.

Another object of the present invention is to provide a means for pretreating an oil base fluid for spotting around stuck drill pipe so that any water wet solids which may be contributing to the sticking of the pipe may be rendered oil wet and less plastic thus making the pipe release more probable.

Another object of the invention is to provide a means for pretreating an oil base fluid so as to minimize interaction at the interface between the oil base fluid and the clay water mud in the hole, thus permitting the smooth passage of logging and other equipment.

A further object of this invention is to provide a means for treating an oil base drilling fluid contaminated with water and/or clay-water mud or other water base drilling fluids to restore suitable viscosity and gel properties to the oil base system. The treatment may either precede or follow contamination.

Still another object of the invention is to provide a means for treating an oil base system so that water wet weight materials may be dispersed therein by displacement of the water phase from the weight material which are then rendered oil wet.

Briefly, this invention includes within its scope the discovery that the above and related objects may be accomplished by adding to the oil base fluid, either before or after the above described contamination, a minor but effective amount of a surface active agent, oil soluble in the system and capable of maintaining alkali metal base and alkaline earth metal base clays substantially uniformly dispersed in the fluid. More particularly, I have found that anionic oil soluble alkyl aryl sulfonic acids and sulfonates are capable of dispersing alkali metal base and alkaline earth metal base clays in oil base drilling fluids. Examples of other types of oil soluble surface active agents or wetting agents which I have found useful in the practice of this invention are oil soluble non-ionic surface active agents such as oil soluble alkylol amides (e.g. diethanolamine ricinoleic amide) and oil soluble alkyl phenyl ethers of polyethylene glycol. Accordingly, by incorporating into the fluid a relatively small amount of such surface active agents, the aforementioned difficulties may be controlled. From a practical standpoint the amount of additive can vary from about 1 to about 6 pounds per barrel of fluid. Amounts above 6 pounds per barrel are generally not required, but as much as 20 pounds per barrel can be used in most systems.

The common aromatic nuclei, benzene and naphthalene, may be alkylated and sulfonated. In the preparation of alkyl aromatic sulfonates the alkylation is almost invariably carried out by means of the reaction between an olefin or aliphatic alcohol and an aromatic hydrocarbon or sulfonic acid, using sulfuric acid as a catalyst. The alkylation can of course be effected by other well known methods such as the Friedel-Crafts reaction. The reaction can be carried out by a variety of alkylating agents such as olefins and alkyl halides, alcohols, ethers, and esters, and it can also be used for the introduction of aralkyl or cycloalkyl groups. The alkylation will also proceed when other substituents such as halogen, amino, hydroxyl, or sulfonic acid groups are present in the aromatic nucleus. Numerous catalysts are used, including: aluminum chloride, ferric chloride, antimony pentachloride, boron trifluoride, zinc chloride, titanium tetrachloride, hydrofluoric acid, sulfuric acid, orthophosphoric acid, and phosphorous pentachloride.

A suitable source of sulfonic acids and their derivatives for use in accordance with the process of my invention is polyalkylated aromatic hydrocarbons.

In the conventional alkylation of aromatic hydrocarbons for the production of substantially water soluble synthetic detergents of the alkyl aryl sulfonate type more than one alkyl radical will frequently attach to an aromatic ring, thus producing a crude alkylation product of varied structure and composition. This necessitates a distillation of the crude alkylation product, wherein the polyalkylated aromatics remain as still bottoms.

These still bottoms, particularly those having a mean molecular weight of more than 300, have been in the past treated by sulfonation in the conventional manner with, for instance, concentrated sulfuric acid and/or oleum, or liquid sulfur trioxide, followed by removal of spent acids, sludge, sulfur dioxide and sulfur trioxide, to obtain substantially oil soluble sulfonic acids which were then neutralized with a suitable base to thereby obtain substantially oil soluble sulfonates, closely resembling the valuable petroleum mahogany sulfonates derived from the acid refining of petroleum lubricating oil fractions under sulfonating conditions.

Alkyl aryl sulfonates possessing a molecular weight and structure of the order of magnitude of dodecyl benzene sulfonate are today a major source of the aforementioned water-soluble detergents and correspondingly, the still bottoms remaining when the crude dodecyl benzene alkylation product is distilled have likewise become a major source of synthetic oil soluble sulfonates.

These still bottoms are generally referred to as "dodecyl benzene still bottoms"—the mixture of polyalkylated aromatics, having a mean molecular weight above 300, which are left behind as still bottoms when a crude dodecyl-benzene alkylation product is distilled.

These still bottoms consist primarily of didodecyl benzene along with other polyalkylated benzene molecules.

Dodecyl benzene still bottoms may be blended with a suitable petroleum lubricating oil fraction prior to sulfonation to give additional oil solubility and higher molecular weights.

An example of such a blend is:

40–80% by weight dodecyl benzene still bottoms.
20–60% by weight lubricating oil fraction The lubricating oil fraction is characterized by the following properties:

Saybolt viscosity at 100° F _____ 70–530
ASTM pour point, ° F _____ −20 to 15
Refractive index at 20° C _____ 1.47–1.50
Specific gravity, 60° F./60° F _____ 0.86–0.90

Dodecyl benzene still bottoms consisting essentially of didodecyl benzene along with other polyalkylated benzene molecules are available commercially from the Sharples-Continental Corporation under the trade name "Neolene 400 bottoms." Typical physical properties of this material are:

Specific gravity at 100° F _____ 0.8639
Viscosity at 130° F. centipoises _____ 45.8
Color _____ Dark brown
Molecular weight _____ 403±15

Engler distillation range:

Percent: ° F.
I.B.P _____ 644
1 _____ 671
5 _____ 698
20 _____ 723
50 _____ 739
70 _____ 753
90 _____ 775
98 _____ 780
F.B.P _____ 780
Percent recovery _____ 99

Sulfonation of "Neolene 400 bottoms" provides an oil soluble sulfonic acid which is suitable for the objects of my invention set forth earlier. Neutral or partially neutral derivatives obtained by reaction of the oil soluble sulfonic acid with inorganic and/or organic bases are also suitable for the practice of my invention.

"Neolene 400 bottoms" may be sulfonated by the following procedure:

1888 pounds of "Neolene 400 bottoms" are charged into a conventional type Monel sulfonator. 1782 pounds of commercial 20% oleum are added cautiously with continuous agitation, holding the temperature to a maximum of 147° F. by circulating water through cooling coils located in the acid mass, and by the rate of oleum addition. Total time for oleum application was 50'.

At the end of the sulfonation 1335 pounds of water are added gradually with stirring, continuing stirring until the sulfonated bottoms and diluted acid are pumped to settler. Washing temperature is held to a maximum of 196° F. by controlling rate of water addition and cooling coils.

Time for washing operation was 90', final temperature was 185° F.

The washed sulfonated mixture was pumped to a glass lined, water jacketed settling tank which had been brought to 185° F. by injecting steam into the water in the jacket. Mass was allowed to settle for 16 hours. At end of this time the temperature had dropped to 152° F.

The diluted acid was drawn off and discarded. The sulfonic acid was drawn off to the neutralization vessel, diluted with 18 gallons 99 percent isopropanol, 18 gallons water and 35 gallons non-volatile highly aromatic petroleum solvent.

The diluted sulfonic acid may be used "as is," or neutralized; in this instance, by the addition of 122 pounds anhydrous ammonia. The finished product comprises 356 gallons miscible with hydrocarbon oils.

If used as the unneutralized sulfonic acid the product must be drawn off into lined (acid inert) drums.

A sulfonated mixture of dodecyl benzene still bottoms and a lubricating oil fraction is commercially available from L. Sonneborn & Sons under the trade name "Petronic Acid." This product and its derivatives are particularly useful in the practice of my invention.

The types of compounds which I have found to be especially suitable for the practice of this invention may be described as oil soluble alkyl, aralkyl, or cycloalkyl aromatic sulfonic acids and sulfonates in which the aromatic nucleus may be monocyclic or polycyclic, and may be halogenated or contain substituents such as hydroxyl, amino, etc. groups.

These may be exemplified as follows:

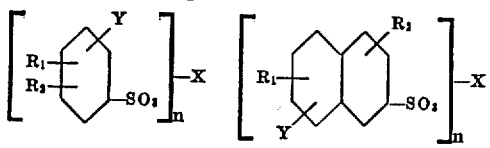

where:

$n$ is an integer from 1–6, inclusive
$R_1$, $R_2$, are the same, or different, alkyl substituents each having from 10–30 carbon atoms
X is one of the following:

H
Alkali metal
Alkaline earth metal
Al, Pb, Cr, Mn, Fe, Co, Ni
$NH_4$
Primary amine·H
Secondary amine·H
Tertiary amine·H Y is one of the following:
Halogen
OH
$NH_2$
H Specific examples of some of the categories described above are given below:

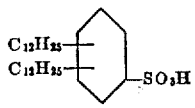

Didodecylbenzene sulfonic acid

Sodium didodecylbenzene sulfonate

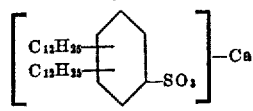

Calcium didodecylbenzene sulfonate

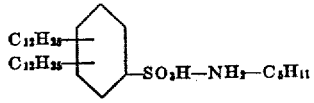

Amylamine didodecylbenzene sulfonate

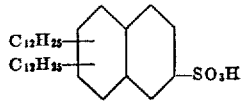

Didodecylnaphthalene sulfonic acid

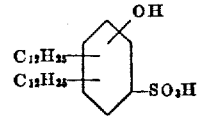

Didodecylphenol sulfonic acid

In general, products of the above type may be described as sulfonates and/or sulfonic acids of aliphatic-aromatic hydrocarbons, comprising the sulfonates and/or sulfonic acids of alkylated benzene, naphthalene, or other aromatic nuclei, aromatic sulfonates and/or sulfonic acids in which the aromatic nuclei are linked by methylene bridges, sulfonates and/or sulfonic acids of alkylated heterocyclic compounds. It is my intention to include within the scope of the same products oil soluble derivatives of water soluble or dispersible sulfonic acids. For example, dodecylbenzene sulfonic acid is water soluble. It may be reacted with an oil soluble amine of sufficient molecular weight to yield an oil soluble amine sulfonate which is useful within the scope of this patent. In like manner an oil soluble amine salt of the condensation product of oleic acid chloride and p-anisidine sulfonic acid,

would be useful.

Other modifications which I find useful include:
Sulfonates and/or sulfonic acids of alkyl-aromatic hydrocarbons in which the sulfonic acid group is attached to the alkyl chain and not to the aromatic nucleus:

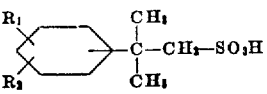

Aromatic sulfonates and/or sulfonic acids obtained by linking two sulfonated alkylated aromatic nuclei by means of a methylene group through reaction with formaldehyde:

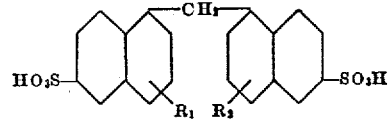

Related products may be obtained by condensing alkyl phenols and aromatic aldehyde sulfonic acids:

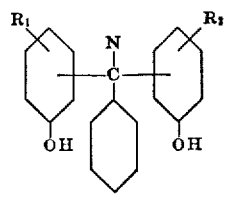

A heterocyclic sulfonate may be derived from the benziminazole nucleus thus: o-phenylene diamine is condensed with stearic acid to give 2-heptadecylbenziminazole, which is then sulfonated to give:

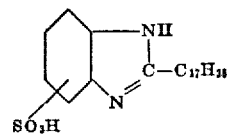

Additional examples of heterocyclic sulfonates and/or sulfonic acids are derived from long-chain alkyl indoles, in which the alkyl group may be attached to the nitrogen or to the alpha carbon atom in the pyrrole ring:

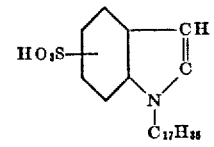

N-heptadecylindole sulfonic acid

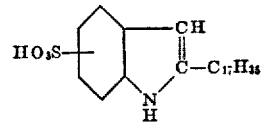

-n-Heptadecylindole sulfonic acid

A related class of useful compounds in the practice of this invention are ester sulfonates, which are based on esters of aromatic carboxylic acids, the sulfonate group being attached to either the ester or the acyl radicle; the sulfonate group is therefore separated from the hydrophobic residue by a polar connecting grouping. Several varieties of ester sulfonic acids are shown in the following general formulae:

(1)
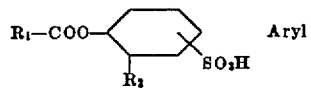

(2)
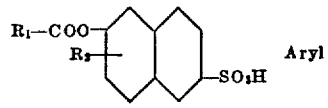

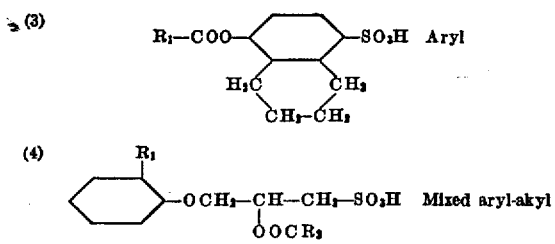

Compounds in the three classes of amide sulfonates and/or sulfonic acids are of interest in the practice of this invention.

Examples of these are shown below:

(1) Sulfoamide compounds

Oleyl-N-ethyloctadecylanilide sulfonic acid

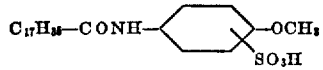

Oleyl-p-anisidide sulfonic acid (2) Sulfoacyl amide compounds

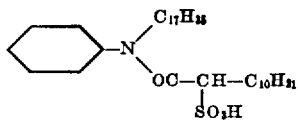

Lauricheptadecylanilide sulfonic acid (3) Sulfonamide sulfonates

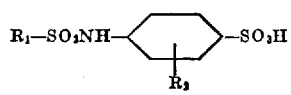

The following specific examples are illustrative of the compositions of the present invention, but it is to be understood that the invention is not to be limited to the specific details thereof:

EXAMPLE I

An oil base drilling fluid made in accordance with Miller U.S. Patent No. 2,475,713 and sold under the trademark "Black Magic Supermix" by Oil Base, Inc., of Compton, California, was utilized as the base drilling fluid. This drilling fluid, as disclosed by the patent and as is well known to those skilled in this art, contains blown asphalt and calcium naphthenate in sufficient combined amounts effective for imparting to the drilling fluid satisfactory gel properties, i.e., to support the weight material to be added, and also to emulsify water normally encountered in the drilling operations. This material was weighted to a density of 17.4 pounds per gallon with barites and was tested with several contaminants, namely water; lime base drilling mud, high pH; bentonite drilling mud, moderate pH, each being added to the oil base fluid in an amount equal to 15% by volume. In each case "Petronic Acid," didodecyl benzene sulfonic acid sold by L. Sonneborn & Sons, was added to the contaminated oil base drilling fluid as an "after-treat" in an amount equivalent to 3 pounds per barrel. The results of the tests are set forth in the following Table I:

Table I

| Sample No. | Contaminant | Additive | Mud properties at 120° F. (after stirring 10' in Mixmaster) | | | Appearance after 10' stirring in Waring Blendor |
|---|---|---|---|---|---|---|
| | | | Va, cps. | Gel, grams | | |
| | | | | 10'' | 10' | |
| 1 | None | None | 160 | 5 | 9 | Very fluid and smooth. |
| 2 | Water (fresh) | do | 230 | 8 | 14 | Fluffy, grainy; high, fast gel. |
| 3 | do | "Petronic Acid" | 155 | 4.5 | 10 | Very fluid and smooth; solids oil wet. |
| 4 | Lime base mud, high pH | None | 190 | 5 | 12 | Too thick to stir; solids water wet. |
| 5 | do | "Petronic Acid" | 170 | 4 | 5 | Very fluid and smooth; solids oil wet. |
| 6 | Bentonite mud moderate pH | None | 257.5 | 8 | 12 | Too thick to stir; solids water wet. |
| 7 | do | "Petronic Acid" | 215 | 5 | 7 | Very fluid and smooth; solids oil wet. |

The surprising effectiveness of the surface active agent additive is readily apparent from the above data. In each case the additive returned the contaminated oil base drilling fluid to a condition at least equal to its original, uncontaminated condition.

EXAMPLE II

The oil base fluid utilized for the purpose of this example was the same as those used in Example I, except that it was weighted to 17 pounds per gallon. As is indicated in Table II, "Petronic Acid" was used as a pretreatment, i.e., by addition to the oil base fluid before addition of the contaminant and also as an "after-treat," i.e., addition after inclusion of the contaminant. Also, in one sample, Petroleum Sulfonate No. 52–S, a sodium mahogany sulfonate sold by Mineral Oil Refining Co. was used as the additive. The amounts of contaminant and additive were the same as in Example I. The results follow:

Table II

| Sample No. | Contaminant | Additive | Mud properties at 120° F. (after stirring 10' in Mixmaster) | | | Appearance after 10' stirring in Waring Blendor |
|---|---|---|---|---|---|---|
| | | | Va, cps. | Gel, grams | | |
| | | | | 10'' | 10' | |
| 8 | None | None | 165 | 6 | 9 | Very fluid and smooth; solids oil wet. |
| 9 | Lime base mud, high pH | do | 192 | 6 | 13 | Too thick to stir; solids water wet. |
| 10 | do | "Petronic Acid" (pretreat) | 167.5 | 5 | 7 | Very fluid and smooth; solids oil wet. |
| 11 | do | "Petronic Acid" (after treat) | 169 | 5 | 7 | Do. |
| 12 | do | Petroleum sulfonate (pretreat) | 180 | 4 | 6 | Do. |

EXAMPLE III

The oil base fluid utilized in this example was the same as in Eexample I, except that it was weighted to 18 pounds per barrel. The amount of the contaminant was the same as in Example I, i.e., 15% by volume, but 4 pounds per barrel of additive was used. The excellent results obtained in correcting very severe contamination is illustrated in Table III.

Table III

| Sample No. | Contaminant | Additive | Mud properties at 120° F. (after stirring 10' in Mixmaster) | | | Appearance after 10' stirring in Waring Blendor |
|---|---|---|---|---|---|---|
| | | | Va, cps. | Gel, grams | | |
| | | | | 10'' | 10' | |
| 13 | None | None | 235 | 8 | 11 | Fluid and smooth; solids oil wet. |
| 14 | Water (fresh) | do | 410 | 15 | 30 | Fluffy, grainy; high, fast gel. |
| 15 | do | Petroleum sulfonate (pretreat) | 230 | 7 | 10 | Very fluid and smooth; solids oil wet. |
| 16 | do | Petroleum sulfonate (after treat) | 245 | 10 | 12 | Do. |

EXAMPLE IV

Here the oil base drilling fluid of Example I was tested at a weight of 18.2 pounds per gallon, the contaminant was 15 percent by volume and the surface active agent additive was included in an amount equivalent to 6 pounds per barrel:

Table IV

| Sample No. | Contaminant | Additive | Mud properties at 120° F. (after stirring 10' in Mixmaster) | | | Appearance after 10' stirring in Waring Blendor |
|---|---|---|---|---|---|---|
| | | | Va, cps. | Gel, grams | | |
| | | | | 10'' | 10' | |
| 17 | None | None | 220 | 3 | 4 | Fluid and smooth; solids oil wet. |
| 18 | Lime base mud, high pH | do | Too high to measure; solids water wet | | | |
| 19 | do | Petroleum sulfonate (after treat) | 220 | 3 | 4 | Very fluid and smooth; solids oil wet. |
| 20 | do | "Petronic Acid" (after treat) | 223 | 3 | 5 | Do. |

The results of Table IV show that even with an extremely heavy density mud, contaminated so severely that the viscosity was too high to measure, the addition of the surface active agents in accordance with this invention brings the mud back to its original, uncontaminated state.

Having fully described my invention, it is to be understood that I do not wish to be limited to the details set forth, but my invention is of the full scope of the appended claims.

I claim:

1. An oil base drilling fluid containing a weight material supported in said fluid to provide a density of at least about 12 pounds per gallon, blown asphalt and calcium naphthenate in sufficient combined amounts to support said weight material and to emulsify water normally encountered in drilling operations, and an effective thinning amount of an oil soluble anionic surface active agent selected from the group consisting of alkyl aryl sulfonic acid, alkyl aryl sulfonate and mixtures thereof, said agent being effective to maintain the weight material in an oil-wet state under conditions of contamination by material selected from the group consisting of water, water-wet solids and mixtures thereof.

2. The drilling fluid composition of claim 1 wherein the said surface active agent is an alkyl aryl sulfonate containing two alkyl substituents, each having from 10-30 carbon atoms.

3. The drilling fluid composition of claim 1 wherein the said surface active agent is present in an amount of about one to twenty pounds per barrel of fluid.

4. A method of drilling a well comprising circulating in the well the drilling fluid composition of claim 1.

5. A method of drilling a well comprising circulating in the well the drilling fluid composition of claim 2.

6. A method of drilling a well comprising circulating in the well the drilling fluid composition of claim 3.

7. In a method of drilling a well wherein an oil base drilling fluid containing a weight material supported in said fluid to provide a density of at least about 12 pounds per gallon, blown asphalt and calcium naphthenate in sufficient combined amounts to support said weight material and to emulsify water normally encountered in drilling operations, is circulated in the well, and wherein said drilling fluid has undesirably thickened due to contamination with material selected from the group consisting of water, water-wet solids and mixtures thereof, the steps comprising adding to said contaminated drilling fluid an effective thinning amount of an oil soluble anionic surface active agent selected from the group consisting of alkyl aryl sulfonic acid, alkyl aryl sulfonate and mixtures thereof, said agent being effective to maintain the weight material in an oil-wet state under said conditions of contamination, and recirculating the treated drilling fluid through the well.

References Cited in the file of this patent

UNITED STATES PATENTS

| 2,216,955 | Moore | Oct. 8, 1940 |
| 2,612,471 | Fischer | Sept. 30, 1952 |
| 2,779,735 | Brown et al. | Jan. 29, 1957 |
| 2,797,196 | Dunn et al. | June 25, 1957 |
| 2,862,881 | Reddie | Dec. 2, 1958 |
| 2,900,336 | Brown et al. | Aug. 18, 1959 |
| 2,943,051 | Lummus | June 28, 1960 |

FOREIGN PATENTS

| 540,798 | Canada | May 14, 1957 |

OTHER REFERENCES

Schwartz et al.: Surface Active Agents, 1949, Interscience Publishers Inc., N.Y., pp. 214 to 217.

Principles of Drilling Mud Control, pub. 1955 by Petroleum Extension Service, The University of Texas Division of Extension, Tenth ed., pp. 48 to 51.

UNITED STATES PATENT OFFICE
CERTIFICATE OF CORRECTION

Patent No. 3,099,624                                              July 30, 1963

Doyne L. Wilson

It is hereby certified that error appears in the above numbered patent requiring correction and that the said Letters Patent should read as corrected below.

Column 5, lines 27 to 31, in the structural formula, immediately after the closing brackets, insert the subscript -- $_2$ --; column 6, lines 21 to 27, the structural formula should appear as shown below instead of as in the patent:

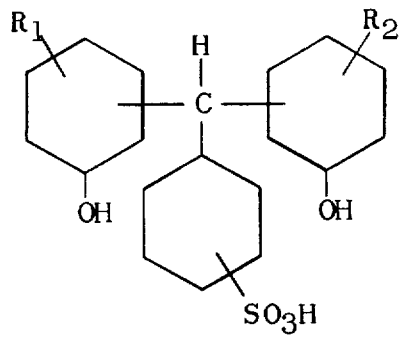

column 6, lines 44 to 49, for the upper right-hand portion of the structural formula reading

column 6, line 58, before "-n-Heptadecylindole" insert
-- alpha --.

Signed and sealed this 5th day of May 1964.

(SEAL)
Attest:

ERNEST W. SWIDER                                  EDWARD J. BRENNER
Attesting Officer                                 Commissioner of Patents